US009310465B2

United States Patent
Yang et al.

(10) Patent No.: US 9,310,465 B2
(45) Date of Patent: Apr. 12, 2016

(54) SYSTEMS AND METHODS FOR REDUCING VARIATIONS IN RECEIVED SIGNAL STRENGTH INDICATOR (RSSI) MEASUREMENTS FOR LOCATION SENSING

(71) Applicant: Intel Corporation, Santa Clara, CA (US)

(72) Inventors: Lei Yang, Hillsboro, OR (US); Xue Yang, Arcadia, CA (US)

(73) Assignee: Intel Corporation, Santa Clara, CA (US)

( * ) Notice: Subject to any disclaimer, the term of this patent is extended or adjusted under 35 U.S.C. 154(b) by 430 days.

(21) Appl. No.: 13/727,771

(22) Filed: Dec. 27, 2012

(65) Prior Publication Data

US 2014/0185464 A1 Jul. 3, 2014

(51) Int. Cl.
*G01S 5/14* (2006.01)
*G01S 5/02* (2010.01)
(52) U.S. Cl.
CPC ............... *G01S 5/14* (2013.01); *G01S 5/0215* (2013.01); *G01S 5/0252* (2013.01)
(58) Field of Classification Search
None
See application file for complete search history.

(56) References Cited

U.S. PATENT DOCUMENTS

| 8,254,864 | B1* | 8/2012 | Perets et al. | 455/226.1 |
|---|---|---|---|---|
| 8,737,992 | B1* | 5/2014 | Haub et al. | 455/434 |
| 2006/0246841 | A1 | 11/2006 | Dennis et al. | |
| 2007/0259624 | A1* | 11/2007 | Alizadeh-Shabdiz et al. | 455/67.11 |
| 2008/0043888 | A1 | 2/2008 | Bhukania et al. | |
| 2008/0130604 | A1* | 6/2008 | Boyd | 370/338 |
| 2009/0224967 | A1 | 9/2009 | Wang et al. | |
| 2010/0097269 | A1* | 4/2010 | Loidl et al. | 342/378 |
| 2010/0128689 | A1 | 5/2010 | Yoon et al. | |
| 2010/0208603 | A1* | 8/2010 | Ishii | 370/252 |
| 2011/0309933 | A1 | 12/2011 | Marino | |
| 2013/0012138 | A1* | 1/2013 | Zhang et al. | 455/67.13 |
| 2013/0039199 | A1* | 2/2013 | Liao et al. | 370/252 |

OTHER PUBLICATIONS

International Search Report and Written Opinion Received for Patent Application No. PCT/US2013/048560, mailed on Sep. 27, 2013, 10 pages.

* cited by examiner

*Primary Examiner* — Christopher Crutchfield
*Assistant Examiner* — Tito Pham
(74) *Attorney, Agent, or Firm* — Sutherland Asbill & Brennan LLP

(57) ABSTRACT

Certain embodiments herein are directed to reducing variations in received signal strength indicator (RSSI) measurements that may be received by a wireless device over a network, such as a WiFi network including one or more access points. A signal sent from an access point may be received by a user device, where channel estimation results associated with the received signal may be analyzed to determine a more accurate location of the user device. The received signal may be converted to at least one of the time domain and the frequency domain, in which signal components associated with the received signal may be identified based on a determination that the signal components may be associated with multipath fading or other types of interference. Such identified signal components, whether in the frequency domain or the time domain may be excluded from a determination of a signal strength measurement that may in turn be used to identify the location of the user device.

5 Claims, 7 Drawing Sheets

SYSTEMS AND METHODS FOR REDUCING VARIATIONS IN RECEIVED SIGNAL STRENGTH INDICATOR (RSSI) MEASUREMENTS FOR LOCATION SENSING

TECHNICAL FIELD

Embodiments of this disclosure relate generally to wireless communication, and more particularly, to determining the location of a wireless-enabled device based on wireless communication data.

BACKGROUND

Existing techniques for locating devices may include the use of wireless networks, such as wireless fidelity (WiFi) networks. Such techniques, however, may struggle to provide accurate location of devices for various reasons, including multipath fading or other types of interference that may cause variations in signal strength used to determine the location of a wireless device. Such variations may be prevalent in indoor facilities or other dense areas in which various objects may attribute to multipath fading or other interferences. Even slight movements in a device's location may cause significant variations in determinations of the device's location by trilateration, fingerprinting, or other location techniques. Applications that may require precise, accurate location information, therefore, may not perform reliably.

Moreover, existing systems may use signal strength information, such as received signal strength indicator (RSSI) measurements, primarily to facilitate communications between wireless devices and access points in WiFi networks. While analysis of RSSI measurement data may enhance communication in a WiFi network, existing systems be limited in the way that they may not consider RSSI measurement data in locating WiFi devices or other wireless devices.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items.

Figure 1:
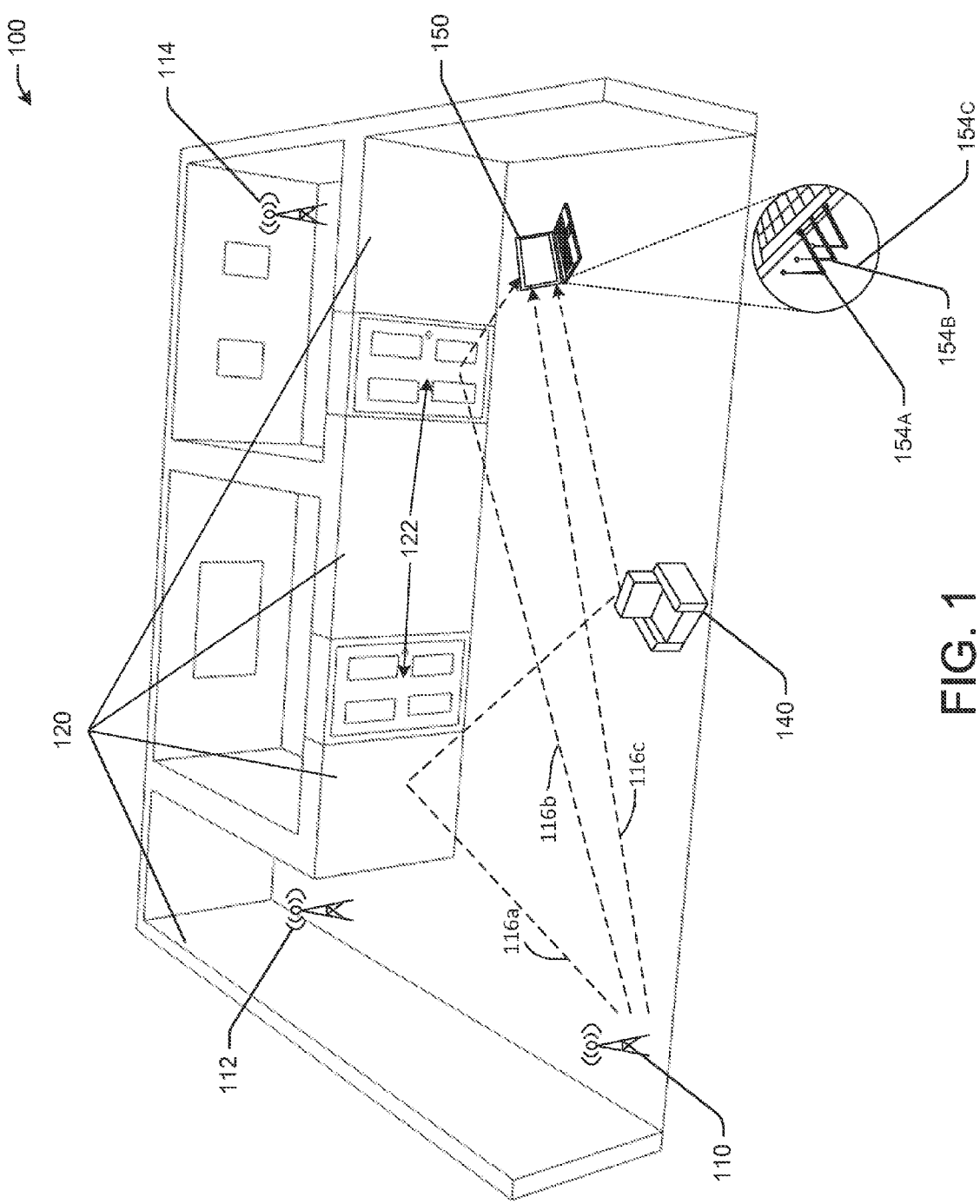
FIG. 1 illustrates a schematic diagram of an example configuration in which the location of a wireless device may be determined, according to an embodiment of the disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Certain embodiments herein relate to, among other things, reducing variations in received signal strength indicator (RSSI) measurements. Wireless-enabled devices, such as laptops, tablets, smart phones, etc., that may be equipped with a wireless network card, may send and receive information over various types of wireless networks. One such type of network is a wireless fidelity (WiFi) network. A WiFi network may rely on one or more access points to communicate information to wireless devices. Indoor facilities or dense exterior areas, for example, may have multiple access points that may serve such a purpose. By using the infrastructure provided by WiFi networks, the location of a device, or other apparatus having a WiFi card or other wireless communication means, may be determined.

Certain embodiments herein are directed to determining the location of such devices based on analyzing signals received from WiFi access points. In one embodiment, a device may determine its location based at least in part on a signal received from an access point. Such a signal may be represented by multiple signal components (e.g., subcarriers in the frequency domain), each of which may carry information associated with a WiFi network, or other network. Each signal component may include, among other information, a phase and an amplitude, which may represent a signal strength component associated with the signal component. Certain signal components, such as those with a relatively low signal strength, may be filtered out or ignored in a determination of an RSSI measurement. The RSSI measurement may be used to determine a more accurate location. As will be described in greater detail below, various techniques in the frequency and time domains may be utilized to determine a more accurate location of wireless devices.

Certain embodiments herein also relate to selectively processing RSSI measurements received by multiple antennas associated with a wireless device, such as a WiFi card. According to these embodiments, signals received by each of the multiple antennas may be analyzed to determine a more reliable set of RSSI information that may be used to determine the location of a wireless device.

Various techniques may be used to determine the location of a wireless device for which an RSSI measurement was determined, such as trilateration, fingerprinting, or other techniques that may rely upon an RSSI measurement to determine a location of the wireless device, such as a WiFi device. Such techniques may more accurately determine the location of a wireless device at least in part by relying upon RSSI measurements that may have reduced variations in signal strength caused by multipath fading or other types of interference, as described herein.

The techniques described herein may facilitate more accurate location of wireless devices for applications that may require a precise location. As an example, an indoor navigation system that may provide turn-by-turn navigation to a user of a wireless device in an indoor environment may leverage RSSI measurements as determined herein to more accurately navigate a user within the indoor location. As another example, a shopping application that may navigate a user of a wireless device to certain items in a store may leverage RSSI measurements as determined herein to more accurately identify the location of items in the store. In either application, more accurate measurements may be required to more precisely navigate dense areas populated with walls, chairs, desks, furniture, display objects, products, etc., which may cause variations in signal strength due to multipath fading or other types of interference. By reducing such variations, certain embodiments herein may provide a more reliable RSSI measurement that may be used to provide a more reliable wireless device location, and hence, more accurate navigation or location of items in indoor environments (or dense outdoor environments) via trilateration, fingerprinting, or other location techniques. Other applications may exist in other examples. Such applications may also require more accurate determinations of the location of wireless devices.

FIG. 1 depicts a schematic diagram of an example configuration in which the location of a wireless device may be determined, according to an embodiment of the disclosure. As shown in FIG. 1, an interior space 100 may include multiple access points 110, 112, and 114 that may communicate with one or more user devices 150. The interior space 100 may also include various objects such as a chair 140, various surfaces such as walls 120 and doors 122, or other objects off of which signals 116a, 116b, and 116c may reflect, refract, etc., resulting in multipath fading, among other results. The user device 150 may include a laptop (shown), a desktop, a tablet, a smart phone, etc. Such devices may include a wireless card, such as a WiFi card, which may include one or more antennas 154. In this way, the user device 150 may function as a WiFi radio. The interior space 100 may be inside a home, office, or other enclosed facility. Other embodiments may include an exterior area that may include densely spaced buildings, hills, mountains, or other obstacles, off of which signals may reflect and result in multipath fading, among other results.

In the example shown in FIG. 1, the user device 150 may scan for signals from available access points, such as access points 110, 112, and 114. Other access points (not shown) may also be determined to be available by the user device 150. In one embodiment, the access points may periodically send a packet, such as beacon packet or other type of packet, via a signal to the user device 150, which the user device 150 may use to determine its location, as will be described in greater detail below. In other embodiments, the user device 150 may send a request to the access point 110 for a beacon packet or other packet, which the user device 150 may receive via a signal and use to determine its location. In the example in FIG. 1, access point 110 may send a signal to the user device 150. As shown in FIG. 1, a portion of the signal may take different paths before reaching the user device 150. For example, signal 116a may reflect off of a wall 120 and a chair 140 before reaching the user device 150, signal 116b may reflect off of a door 122 before reaching the user device 150, and signal 116c may travel directly to the user device 150. Thus, each portion of the signal may arrive at the user device 150 at different times.

Each antenna 154 may receive the same or different RSSI measurements from the signals 116a, 116b, and 116c received at the user device 150. As described above, each signal component associated with a signal may have a different amplitude that may contribute to the RSSI for the signal. As will be described in greater detail below, the user device 150 may analyze each of the signal components and modify the RSSI to arrive at a different RSSI that may be used to determine the location of the user device 150.

The user device 150 may also include a radio receiver (not shown). A physical layer interface in the radio receiver may include a radio frequency (RF) unit that may be configured to provide for reception of one or more RF signals, such as signals 116a, 116b, and 116c, at one or more frequencies. According to one configuration, the RF unit may include an amplifier, a mixer, a local oscillator, and so forth. The RF unit may be implemented as discrete electronic components, integrated circuits, software-defined radio, or a combination thereof, according to various configurations. The user device 150 may further include a radio transmitter that may send one or more RF signals to one or more access points 110, as an example. In some configurations, the user device 150 may include a radio transceiver that may receive and send RF signals. The transceiver (or the receiver and/or the transmitter) may be coupled to one or more antennas (e.g. antennas 154a, 154b, and 154c) associated with the user device 150, in one embodiment.

The example shown in FIG. 1 is not meant to be limiting. For example, fewer or more signals may reflect or refract off of fewer or more surfaces before reaching a user device 150. Fewer or more access points may exist, at least some of which may send signals to the user device 150. Thus, while only one access point is shown sending a signal to the user device 150, more access points may also send signals to the user device 150, e.g., simultaneously. Numerous other examples may exist in other embodiments.

Figure 2:
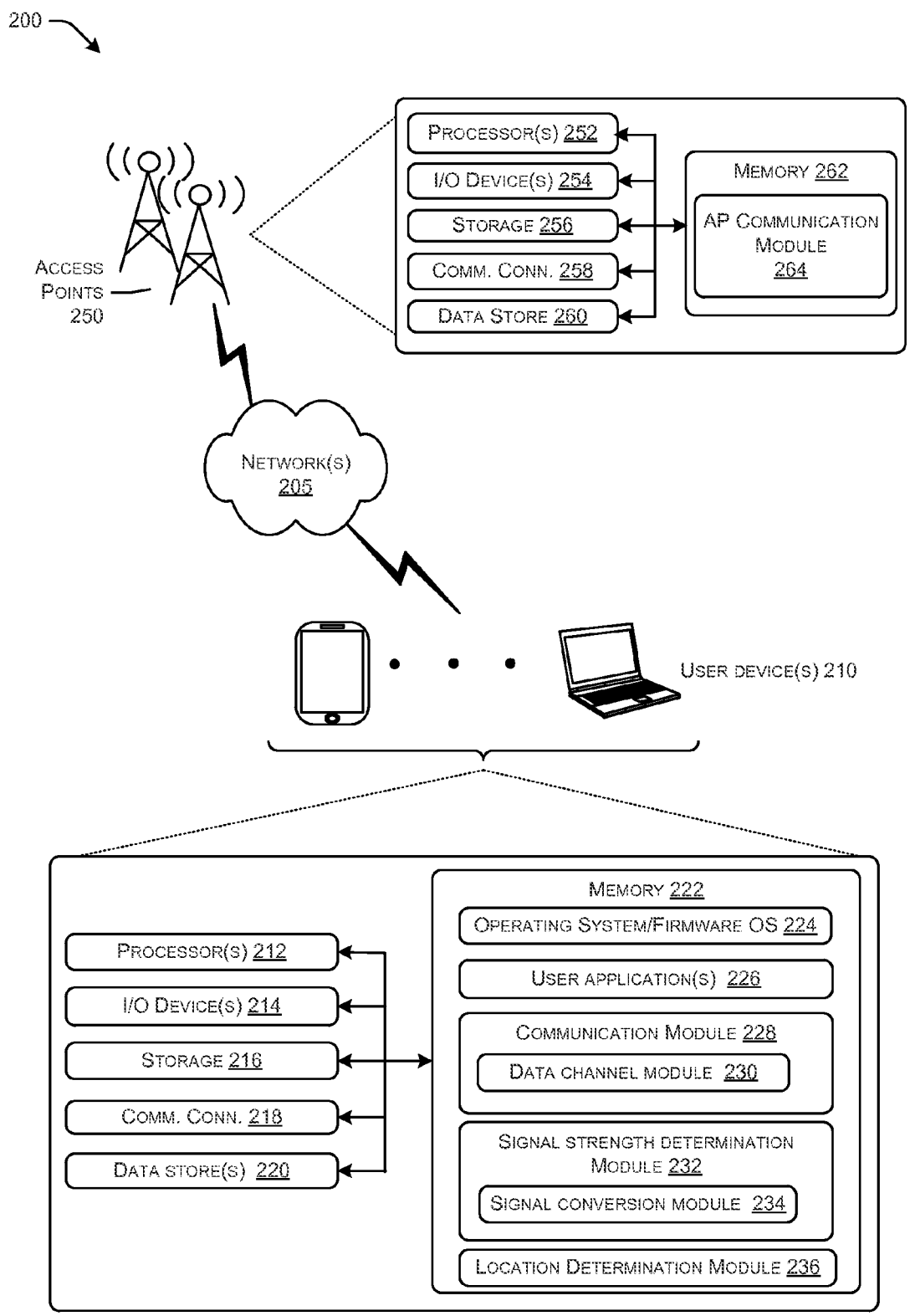
FIG. 2 illustrates a block diagram of an example computing system for determining the location of a wireless device, according to an embodiment of the disclosure.

FIG. 2 depicts a block diagram of an example computing system 200 for determining the location of a wireless device, according to an embodiment of the disclosure. The computing system 200 may include, but is not limited to, one or more access points 250 and one or more user devices 210. An access point 250 may communicate with a user device 210 over one or more networks 205. According to certain embodiments herein, a WiFi network may facilitate communication between the access point 250 and the user device 210. For example, the access point 250 may send to the user device 210 a packet (e.g., a beacon packet) via a modulated signal, which may be analyzed by the user device 210 to determine its location. Further, the user device 210 may send RSSI measurement data to a server on the network 205, which may use the data to determine the location of the user device 210. The server may send the determined location, as well as other information, to the user device 210. The user device 210 may be configured to determine its location in other embodiments. Different types of communication involving different types and number of devices, etc., may exist in other examples. For example, although only two access points 250 are shown in FIG. 2, fewer or more access points may exist in other configurations.

As used herein, the term "device" may refer to any computing component that includes one or more processors that can be configured to execute computer-readable, computer-implemented, or computer-executable instructions. Example devices can include personal computers, server computers, server farms, digital assistants, smart phones, personal digital assistants, digital tablets, Internet appliances, application-specific circuits, microcontrollers, minicomputers, transceivers, or customer premise equipment such as set-top boxes, kiosks, or other processor-based devices. The execution of suitable computer-implemented instructions by one or more processors associated with various devices may form special purpose computers or other particular machines that may implement the reduction in variations in RSSI measurements to facilitate determining a more accurate location of a wireless device.

As used herein, the terms "subcarrier," "subcarrier signal," "component," "signal component," or similar, may refer to portions of a modulated signal. Such portions may be analyzed to identify multipath fading or other types of interference that may affect certain portions but not other portions, and may be further analyzed to exclude the affected portions from determinations or calculations of an RSSI measurement. The term "subcarrier," or similar, may refer to a particular modulation frequency in the frequency domain, while the term "component," or similar, may refer to portions of a signal in the time domain, or more generally, may refer to portions of a signal in the frequency domain.

Various modulation techniques may be used for modulating signals from an access point (e.g., the access point 250) to a user device (e.g., the user device 210). Such techniques may include, but are not limited to, Orthogonal Frequency Division Multiplexing (OFDM), dense wave division multiplexing (DWDM), phase-shift keying (PSK), frequency-shift keying (FSK), amplitude-shift keying (ASK), and quadrature amplitude modulation (QAM).

The one or more networks 205 may facilitate communication between the devices shown in FIG. 2. The one or more networks 205 may include any number of wired or wireless networks that can enable various computing devices in the example computing system 200 to communicate with one another. In some embodiments, other networks, intranets, or combinations of different types of networks may be used including, but not limited to, wireless fidelity (WiFi) networks, WiFi Direct networks, Bluetooth® networks, the Internet, intranets, cable networks, cellular networks, landline-based networks, radio networks, satellite networks, or other communication mediums connecting multiple computing devices to one another. Other embodiments may not involve a network and may, for example, provide features on a single device or on devices that are directly connected to one another, e.g., the user device 210 may be directly connected to a server (not shown) that may determine the location of the user device 210 based on a determined RSSI measurement as described herein.

The devices in FIG. 2 may include one or more processors configured to communicate with one or more memory devices and various other components or devices. For example, the user device 210 may include one or more processors 212, one or more input/output (I/O) devices 214, storage 216, one or more communication connections 218, and one or more data stores 220. The processor 212 may be implemented as appropriate in hardware, software, firmware, or a combination thereof. The processor 252 associated with the access point 250 may be the same or at least similar to the processor 212, in one embodiment.

The memory 222 may store program instructions that are loadable and executable on the processor 212, as well as data generated during the execution of these programs. Depending on the configuration and type of the user device 210, the memory 222 may be volatile, such as random access memory (RAM), and/or non-volatile, such as read-only memory (ROM), flash memory, etc. In one embodiment, the memory 222 may include non-volatile, firmware memory that may store instructions for a WiFi or other networking card. The memory 262 associated with the access point 250 may be the same or at least similar to the memory 222, in one embodiment.

The storage 216 may include removable and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The storage 256 associated with the access point 250 may be the same or at least similar to the storage 216, in one embodiment. In some configurations, the access point 250 may not include storage 256 but may store data in a flash memory 262.

The memory 222 and the storage 216, both removable and non-removable, are all examples of computer-readable storage media. For example, computer-readable storage media may include volatile and non-volatile, removable and non-removable media implemented in any method or technology for storage of information such as computer-readable instructions, data structures, program modules, or other data. In some implementations, the memory 222 may include multiple different types of memory, such as static random access memory (SRAM), dynamic random access memory (DRAM), or ROM.

The one or more communication connections 218 may allow the user device 210 to communicate with other devices, such as the access point 250, databases, and various other devices that may exist on the one or more networks 205, such as a server for determining a location of the user device (not shown). In one embodiment, the communication connections 258 associated with the access point 250 may be the same or at least similar to the communication connections 218.

The I/O devices 214 may enable a user to interact with the user device 210 to perform various functions, including installing firmware or software updates to the user device 210, as a non-limiting example. The I/O devices 214 may include, but are not limited to, a keyboard, a mouse, a pen, a voice input device, a touch input device, a display, a camera or an imaging device, speakers, or a printer. The I/O devices 254 associated with the access point 250 may be the same or at least similar to the I/O devices 214, in one embodiment.

The one or more data stores 220 may store lists, arrays, databases, flat files, etc. In some implementations, the data stores 220 may be stored in memory external to the user device 210 but may be accessible via the one or more networks 205, such as with a cloud storage service. The data stores 220 may store information that may facilitate the processes described herein, such as received and modified RSSI data, fingerprint information for access points, access information for remote servers or databases that may store fingerprint and other information, etc. In one embodiment, the data stores 260 associated with the access point 250 may be similar to the data stores 220. The data stores 260 associated with the access point 250 may not exist in some configurations.

The memory 222 may also store an operating system (O/S) 224 and various software applications and/or modules that may implement or facilitate the processes described herein. Example modules may include, but are not limited to, one or more user applications 226, a communication module 228 (which may include a data channel module 230), a signal strength determination module 232 (which may include a signal conversion module 234), and a location determination module 236. Each of these modules may be implemented as individual modules that provide specific functionality associated with reducing variations in RSSI measurements. Alternatively, one or more of the modules may perform all or at least some of the functionality associated with the other modules.

Further, at least a portion of the modules in the memory 222 may be executed as instructions in memory firmware, while other modules may not. For example, in one embodiment, the data channel module 230 may be executed as instructions in non-volatile firmware, while at least a portion of the other modules in the memory 222 may be executed in volatile memory.

Certain configurations may also include a wireless device driver (not shown), such as a WiFi driver, that may receive RSSIs from one or more access points 250, in one embodiment. Determinations of RSSI measurements as described herein may be different from signal strength indicators received by a WiFi driver, in certain embodiments herein.

The communication module 228 may configure the user device 210 to communicate with other devices (e.g., access points 250) over the one or more networks 205, which may include a WiFi network, a WiFi Direct network, a Bluetooth® network, etc. In one example, the communication 228 module may receive information from an access point 250. Such information may include a packet (e.g., a beacon packet or other type of packet) modulated via a signal that may be used by the user device 210 to determine an RSSI measurement, as described in detail below. In another example, the communication module 228 may send a request to an access point 250 to receive a beacon packet or other packet. As used herein, a beacon packet may include information about a wireless local area network (WLAN). Such information may be transmitted periodically to indicate the presence of a WLAN. In some embodiments, such information, and/or other information, may be communicated by a packet other than a beacon packet.

To facilitate communication with a user device 250, an access point 250 may include an AP communication module 264 that may configure the access point 250 to receive requests for packets (e.g., beacon packets) or other information, as well as send a signal including the beacon packet to the user device 210.

Upon receiving a beacon packet, the user device 210 may utilize it to determine an RSSI measurement as described herein. The communication module 228 may further communicate with a remote server (not shown) that may process RSSI measurements or other data to determine a location of a user device 210. For example, the user device 210 may send determined RSSI measurements to the server and may receive a location for the user device 210 from the server. As mentioned above, the user device 210 may also determine its own location, for example, via the location determination module 236, as will be described in greater detail below.

The communication module 228 may include a data channel module 230. The data channel module 230 may access channel estimation results associated with wireless signals received from an access point 250. Channel estimation results may provide an amplitude, a phase, an identification of the transmitting device (e.g., an access point 250), etc., associated with each signal component in a signal received by the user device 210. In one embodiment, the data channel module 230 may access the physical layer of a wireless card, such as a WiFi card, to obtain the channel estimation results. The data channel module 230 may communicate with a WiFi driver to obtain the channel estimation results, in other embodiments. In certain embodiments, channel estimation results may be a component of wireless signals received by a wireless device, such as a WiFi radio or other wireless enabled device, e.g., the user device 210. In an example configuration, the data channel module 230 may identify thirty (30) signal components that may be analyzed in a determination of RSSI. Any number of signal components may be analyzed in other configurations.

The signal strength determination module 232 associated with the user device 210 may determine an RSSI measurement based at least in part on the channel estimation results. Such an RSSI measurement may be different from an RSSI measurement provided by a WiFi driver, or other wireless driver, associated with the user device 210, in one embodiment. In certain embodiments, the RSSI measurement determined by the signal strength determination module 232 may be void of signal components that may be associated with reduced signal strength, which may be caused by multipath fading or other types of signal interference. Such signals may cause variations in RSSI measurements that may distort the RSSI measurements and ultimately the determination of a user device's 210 location.

Figure 3:
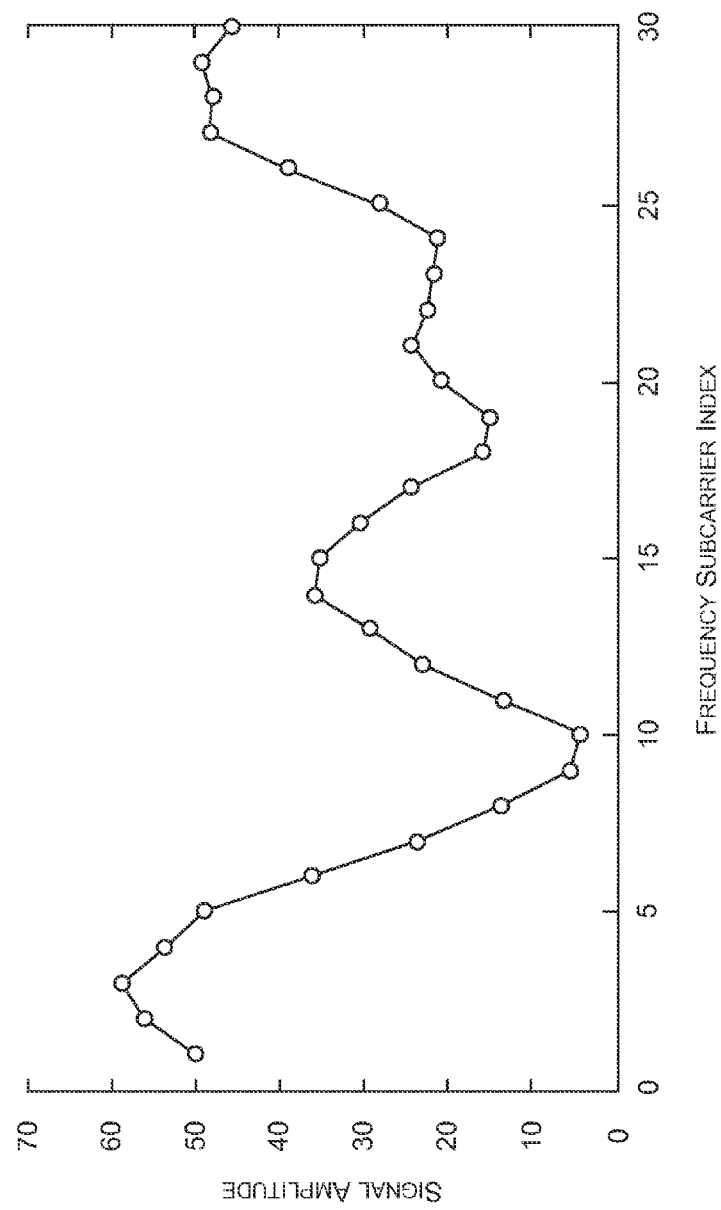
FIG. 3 is a graphical illustration of an example received signal, including amplitude and phase for each signal component included in the example signal, according to an embodiment of the disclosure.
Figure 4:
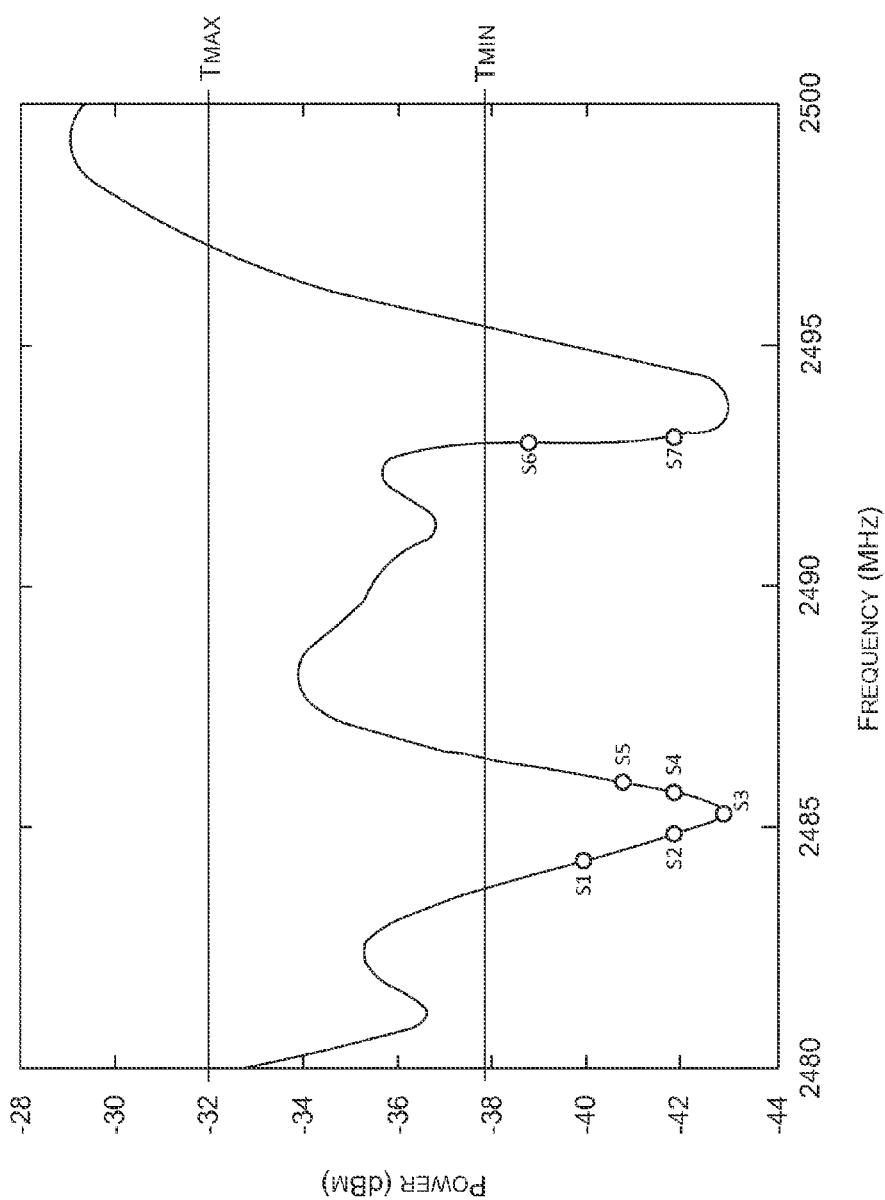
FIG. 4 is a graphical illustration of the example signal in FIG. 3 represented in the frequency domain, according to an embodiment of the disclosure.

The signal strength determination module 232 may perform various functions to determine an RSSI measurement with reduced variations. For example, the signal strength determination module 232 may include a signal conversion module 234 that may convert a signal received from the access point 250 into the frequency domain or the time domain, in both of which the signal may be analyzed to determine an RSSI measurement as described herein. A received signal expressed in terms of amplitude and phase, as shown in FIG. 3, may be converted to the frequency domain in which it may be expressed as power (in decibels or dBm) and frequency (Megahertz or MHz). A received signal may also be converted to the time domain using a Fourier transform, in one embodiment. One or more algorithms may apply the Fourier transform and/or additional processing to produce a signal having an amplitude and a time unit. As shown in FIG. 4, a signal converted to the time domain may be expressed as a power (dBm) and a normalized frequency value.

To determine which signal components in the frequency and/or time domain should be excluded due to multipath fading or other types of interference, the signal strength determination module 232 may determine one or more thresholds for filtering out certain signal components. Various types of thresholds may be applied. For example, in the frequency domain, signal components that have an amplitude or signal strength above a maximum threshold or below a minimum threshold may be excluded from the determination of an RSSI measurement. The maximum and minimum thresholds may be determined using various criteria. In one embodiment, the maximum and minimum threshold may be established such that the top ten percent (10%) and bottom ten percent (10%), respectively, of the signal components are excluded. Other such threshold values may exist in other embodiments.

In another example, the signal strength determination module 232 may analyze the shape of a signal to determine the location of certain signal components along the shape. For example, signal components having amplitudes that are located in a valley or lowermost portion of a signal may be excluded from the RSSI measurement. Such a valley may be identified by signal components having amplitudes that are located along the lowermost or cup-liked portion of the signal, in one embodiment.

As another example, the shape of the signal may be further analyzed to consider changes in signal components relative to adjacent signal components. For example, a signal component having an amplitude that is significantly lower than an amplitude for a preceding signal component may be excluded from an RSSI measurement determination. Significantly lower may mean that the change in amplitude is ten percent (10%) or greater, in one embodiment. Other percentage changes may exist in other embodiments, each of which may serve as a threshold to use in excluding certain signal components from an RSSI measurement determination. Following this approach, adjacent signal components that are shaped relatively flat may not be excluded from a determination of an RSSI measurement.

After excluding one or more signal components based on the techniques mentioned above, the signal strength determination module 232 may determine an RSSI measurement. In one embodiment, such a determination may be based on a mathematical calculation. For example, an average, weighted average, etc., of amplitudes associated with selected signal components (e.g., non-excluded signal components) may be used in various embodiments to determine an RSSI measurement. An example of such determinations will be described in greater detail below.

Various other techniques may be used in other embodiments to exclude or ignore certain signal components from a determination of an RSSI measurement. Such techniques may be based on statistical analysis techniques that may select signal components that may establish a certain confidence or degree of certainty that an RSSI measurement used to determine the location of a wireless device is accurate, e.g., includes reduced variations caused by multipath fading or other types of interference.

The signal strength determination module 232 may analyze signals converted to the time domain (e.g., by the signal conversion module 234) to identify one or more dominant portions of the signal. Dominant portions of a signal may have amplitudes that are significantly higher than amplitudes associated with other portions, such as those associated with signal components that are affected by multipath fading or other interference types. In one embodiment, the signal strength associated with the dominant component, which may be based on the amplitude of the dominant signal, may represent the RSSI measurement that may be used to determine the location of a wireless device, e.g., the user device 210. An example of identifying the dominant portion of a signal will be described in greater detail below.

The location determination module 236 may determine the location of a user device, such as a user device 210 that received a signal from an access point 250. Various techniques may be utilized to determine such a location. Example techniques may include, but are not limited to, trilateration and fingerprinting, both of which may receive an RSSI measurement as determined herein as an input for determining the location of a wireless device. For example, following a trilateration approach, locations associated with multiple access points 250, and an RSSI measurement with reduced variations according to certain embodiments herein, may be used to determine a more accurate location of a wireless user device 210. According to the trilateration technique, RSSI measurements as determined herein may be converted into distances relative to an access point from which a signal used to determine the RSSI measurements was received. Such distances, along with locations of access points, may be used to determine a location of the user device 210, in one embodiment.

As another example, following the fingerprinting approach, RSSI measurements having reduced variations as determined herein may be paired with respective locations at which the RSSI measurements were received. Upon a user device 210 receiving a signal from an access point 250, the user device 210 (e.g., via the signal strength determination module 232) may determine an RSSI measurement, which the location determination module 236 may compare to existing RSSI/location pairs to identify a pair having the same or a similar RSSI measurement as that determined by the user device 210. A location of the RSSI/location pair associated with the same or similar RSSI measurement may indicate the location of the user device 210, in one embodiment.

The location determination module 236 may access a data store (e.g., the data store 220), a database, a file, an array, a list, etc., that may store location information for access points 250, RSSI measurements and their corresponding locations (e.g., as may also be stored in a fingerprint database), as well as other information. For example, the location of access points 250, RSSI measurements of the access point at various locations such as dense locations (e.g., for the fingerprinting location technique), as well as other information, may be stored using one or more of the storage mechanisms above.

In some embodiments, the functionality provided by the location determination module 236 may be performed by a remote server, for example. According to these embodiments, the communication module 228 associated with the user device 210 may send RSSI measurements having reduced variations to the server device for a determination of the location of the user device 210. The determined location may be sent from the server to the user device 210, where it may be used by one or more user applications 226.

The user applications 226 may rely on more accurate location information. Example applications may include, but are not limited to, an indoor navigation application and a shopping application, as described above. With accurate location information, the navigation application may instruct a user more precisely on when to turn into an office, such as when to turn into a door for the office that is located relatively close (e.g., ten feet) to another door for another office. Similarly, the shopping application may use accurate location information to identify a particular aisle in a store that may be located at a relatively close distance (e.g., seven feet) to another aisle.

The above configuration in FIG. 2 is not meant to be limiting. Numerous other configurations and examples may exist in other embodiments. Further, references to WiFi, such as WiFi communication, WiFi devices, WiFi networks, etc., may not be limited to WiFi. Various other types of wireless communication networks, techniques, protocols, devices, etc., may exist in other embodiments.

Returning to the example illustration in FIG. 1, portions of a signal (e.g., 116a, 116b, and 116c) may be received by the user device 150 (e.g., via the communication module 228). The user device 150 may analyze each portion of the signal (e.g., via the data channel module 228 in FIG. 2) to identify portions that may be affected by multipath or other types of interference, which may be caused by the signals 116a and 116b reflecting off of objects in the interior space 100, among other occurrences. The signals 116a, 116b, and 116c may represent the different paths along which signals may travel to the user device 150. Signals traveling along such paths may arrive at the user device 150 at different times and may result in at least some of the signal components in the signals having distorted signal strengths due to multipath reflections or other types of interference. For example, portions 116a and 116b of the signal may reflect off of a wall and chair (portion 116a) and a door (portion 116b), whereas portion 116c of the signal may travel directly to the user device 150.

In one embodiment, an amplitude and a signal component index may be obtained for each signal component in the signal portions 116a, 116b, and 116c via channel estimation results. Channel estimation results may be obtained by the communication module 228 in FIG. 2, in one embodiment. Channel estimation results may be depicted in a graph 300, such as that shown in FIG. 3. In one example, the x-axis of the graph may represent a signal component index that may indicate a frequency associated with each signal component. The y-axis of the graph may represent a signal amplitude associated with each signal component. Thus, for example, signal component one (1) may have a relative signal amplitude of approximately fifty (50), signal component two (2) may have a relative signal amplitude of approximately fifty-seven (57), etc.

The signal depicted in FIG. 3 may be converted to the frequency domain or time domain, in various embodiments. An example of a signal converted to the frequency domain is shown in FIG. 4. A graphical illustration 400 of a frequency domain signal may include a power (dBm) measurement of the signal and a frequency (MHz) associated with each component in the signal. The graphical illustration shown in FIG. 4 is for illustration purposes only and is not meant to represent a conversion of the signal in FIG. 3 to the frequency domain.

As described above, one or more thresholds or filtering techniques may be utilized to separate signal components that may be affected by multipath fading (e.g., small-scale channel fading, deep fading, etc.) or other types of interference. In one embodiment, a threshold maximum and a threshold minimum may be established to filter out such signal components, shown as $T_{max}$ and $T_{min}$, respectively, in FIG. 4. Various criteria may be used to determine a threshold maximum and threshold minimum. For example, a certain percentage of signal components having the highest relative power (dBm) value and/or the lowest relative power (dBm) value may be excluded. As another value, certain values above and below a threshold value may be used to exclude certain signal components. For example, in FIG. 4, signal components above −32 dBm and signal components below −38 dBm may be excluded from a determination of an RSSI measurement, and hence, from a determination of a location of a user device, such as the user device 210 in FIG. 2.

Upon excluding signal components outside of the example $T_{max}$ and $T_{min}$ ranges shown in FIG. 4, power (dBm) values associated with signal components within the threshold may be used to determine an RSSI measurement. In one embodiment, an average value of the power (dBm) values may be used to determine an RSSI measurement, which may be expressed in dBm or another measure of signal power. A weighted average or other mathematical or statistical calculations may be used in other embodiments to determine an RSSI measurement. Such an RSSI measurement may be referred to herein as having reduced variations or similar terms to indicate that signal components affected by multipath fading may not have been considered in a determination of the RSSI measurement.

Another technique for filtering out signal components that may be affected by multipath fading may be based on the shape of a frequency domain signal. In one embodiment, the signal strength determination module 232 may analyze values of consecutive signal components to determine a shape of the signal. For example, descending power values −40 dBm, −42 dBm, and −43 dBm associated with signal components S1, S2, and S3, respectively, followed by ascending power values −42 dBm and −41 dBm associated with signal components S4 and S5, respectively, may indicate a cup-shaped portion, valley, or dip associated with the signal. In one embodiment, such signal components may be determined to have experienced deep fading (e.g., given their values relative to other values in the signal) and therefore may not be considered in an RSSI measurement determination. In other embodiments, because the signal components comprise the cup-shaped portion of the signal, they may be excluded from a determination of an RSSI measurement. In yet other embodiments, signal components having power (dBm) values that may be along the descent or ascent of the cup-shaped signal may also be excluded by virtue of their being a portion of the cup-shape or valley.

In another example, a signal component having a power that is significantly lower than a power associated with a preceding signal component may be excluded from an RSSI determination. For example, as shown in FIG. 4, a relatively steep decline from S6 to S7 exists (e.g., from −39 dBm to −42 dBm, which represents a 7.6% decline in power values and a value greater than other decline in the present graph, for purposes of illustration). In one embodiment, a threshold greater than 6%, for example, may be applied to such declines such that signal components having declines greater than the threshold value may be excluded from a determination of an RSSI measurement.

The example techniques above are not meant to be limiting. Other techniques, including statistical analysis, etc., may be used in other embodiments.

Figure 5:
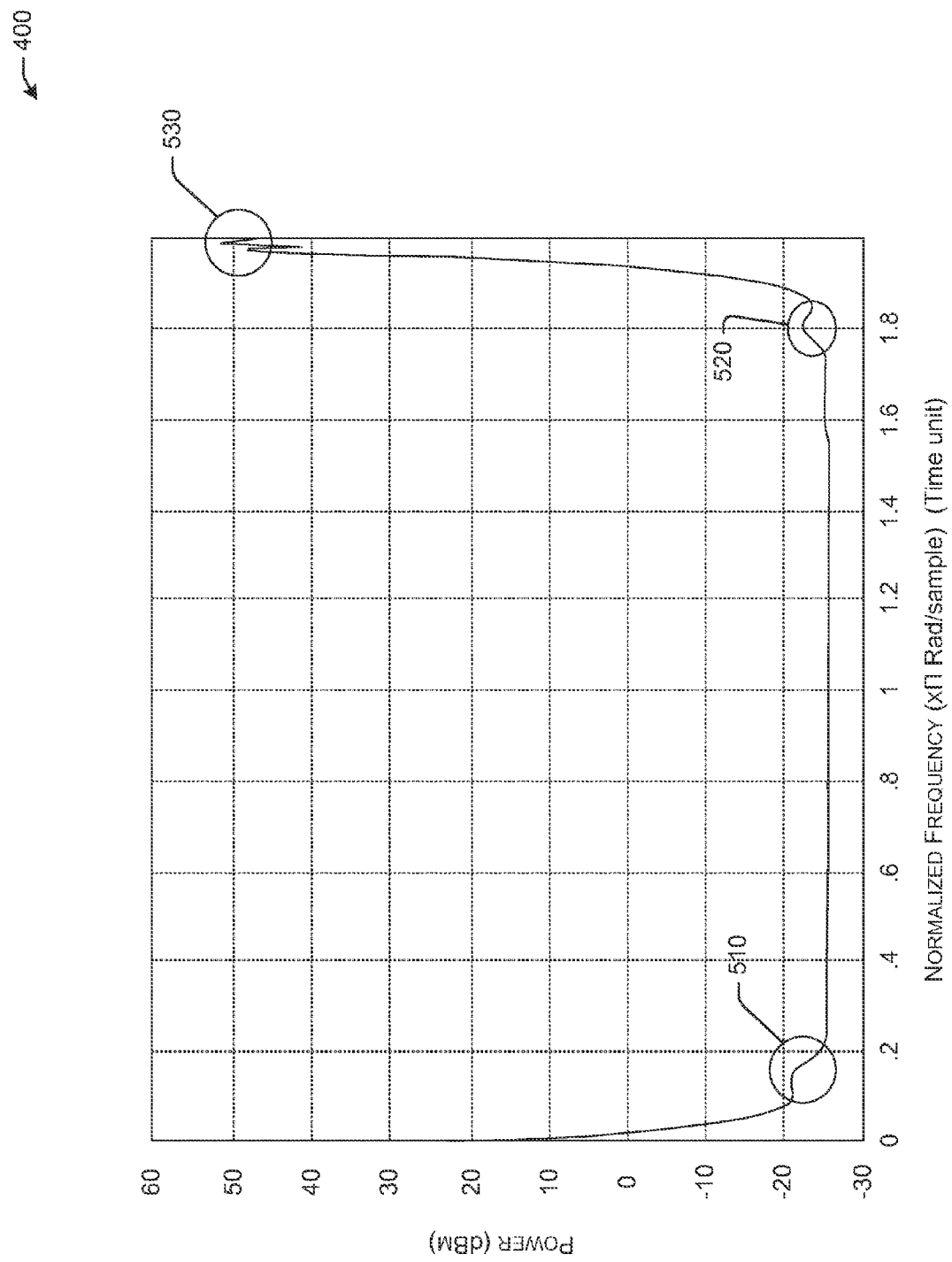
FIG. 5 is a graphical illustration of an example received signal in the time domain, according to an embodiment of the disclosure.

FIG. 5 depicts a graphical illustration of an example received signal in the time domain, according to an embodiment of the disclosure. Such a signal may include multiple signal components 510, 520, and 530. Although only three components are labeled in FIG. 5, fewer or more signal components may exist in other embodiments. The x-axis of the graph in FIG. 5 may include a power measurement (e.g., dBm), and the x-axis may include a time unit or normalized frequency. An RSSI measurement may be determined based on an identification of a dominant signal component among one or more other signal components. Such a signal component may be identified (e.g., by the signal strength determination module 232) based on its power (dBm) value relative to that for other signal components. As shown in FIG. 5, signal 530 has a power (dBm) that is significantly higher than that associated with signal components 510 and 520. In the present example, signal component 530 has a power value of approximately 51 dBm, whereas signal component 510 has a power value of approximately −22 dBm, and signal component 520 has a power value of −23 dBm. Signal components 510 and 520, therefore, by virtue of their having a power value that is significantly less than that for the signal component 530, may be identified as signals that may be impacted by multipath fading.

In one embodiment, whether a power value is significantly less than another power value may be determined based on a threshold value. For example, a signal component having a power value that is greater than three-hundred percent (300%) of the power value of the next closest single component in power value may be considered a dominant signal. In the present example, signal component 530, which is has a power value that is 342% greater than a power value for the signal component 510, may be determined to be the dominant signal. Other percentage values, absolute values, etc., as well as different techniques, may be used to determine a threshold value in other examples. Other techniques may be applied to determine the dominant signal in other examples.

Returning to FIG. 1, the user device 150 may include multiple antennas 154a, 154b, and 154c. Although three antennas are shown in FIG. 1, fewer or more may exist in other embodiments. For example, the embodiments described above may be directed to determining an RSSI measurement based on signals received by a single antenna (e.g., 154a). In other embodiments, each of the antennas 154a, 154b, and 154c may receive signals from access points 110, 112, and 114. Although the antennas 154a, 154b, and 154c may receive the same signals, a different signal strength measurement may be associated with each antenna. According to one embodiment, channel estimation results associated with each antenna may be analyzed (e.g., as described above) to identify an RSSI measurement that may have been affected by multipath fading or other types of interference. The techniques described above in association with FIG. 4 and FIG. 5, as non-limiting examples, may be applied to such channel estimation results to determine an RSSI measurement that may have reduced variations. As used herein, the RSSI measurement may have reduced variations in the way that signal components that may be affected by multipath fading or other types of interference may not be considered in the determination of the RSSI measurement. Such an RSSI measurement may also be expressed as a new or modified RSSI measurement because it may not include variations caused by multipath fading or other types of interference that may be present in original RSSI measurements, e.g., as initially received by the user device 210 from an access point 250, according to certain embodiment.

As described above in association with FIG. 4 and FIG. 5, an RSSI measurement for each of the antennas 154a, 154b, and 154c may be determined by calculating an average, a weighted average, etc., of the power values (dBm) to determine an RSSI measurement, according to one embodiment. Such an RSSI measurement may not include variations from signal components that may be affected by multipath fading or other types of interference.

Figure 6A:
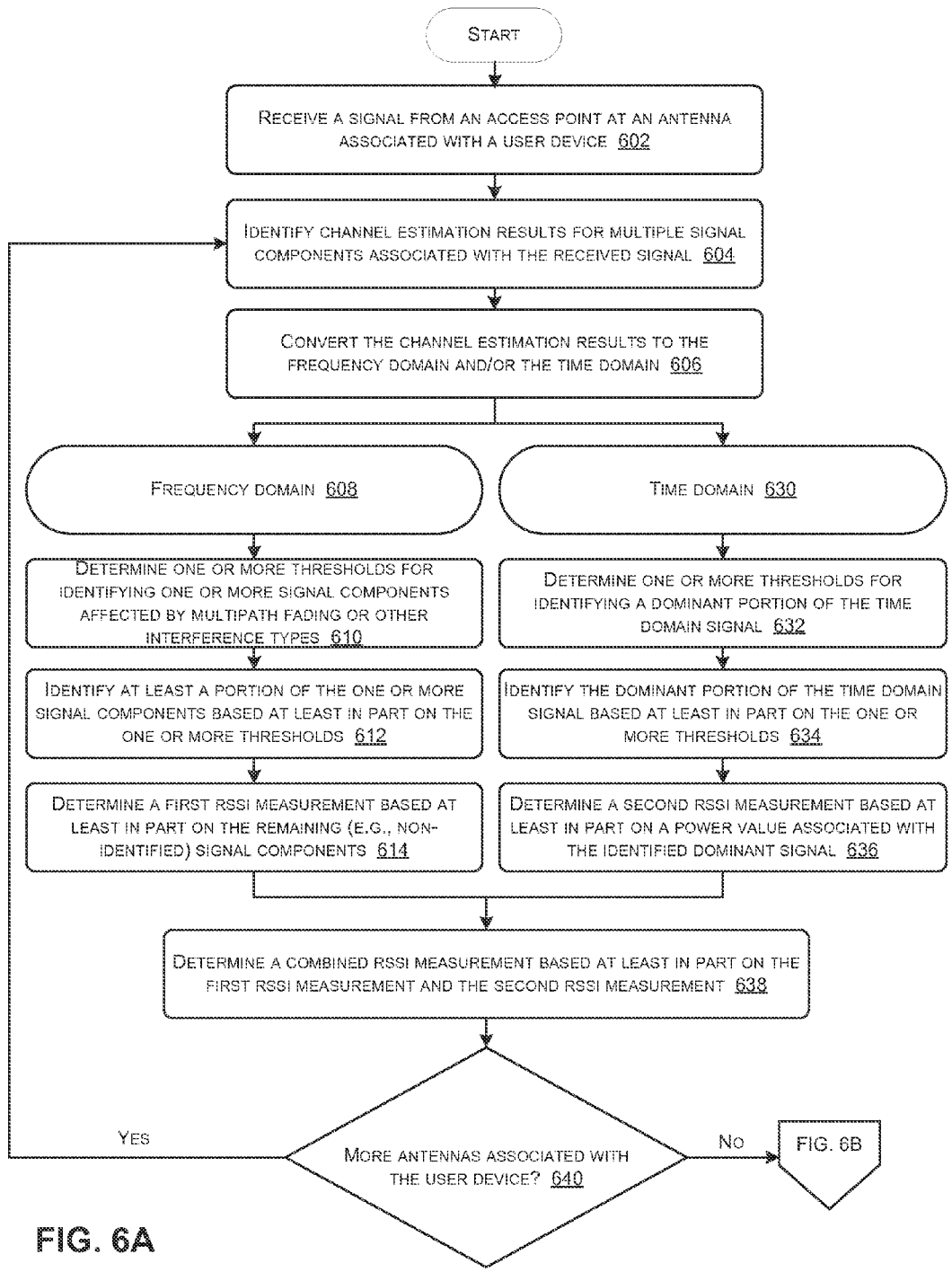
FIG. 6A illustrates a flow diagram of an example process for reducing variations in RSSI measurements, according to an embodiment of the disclosure.

FIG. 6A depicts a flow diagram of an example process for reducing variations in RSSI measurements, according to an embodiment of the disclosure. The example process may be performed by the user device 210 in FIG. 2, in one embodiment. The example process may begin at block 602, where a signal from an access point (e.g., the access point 250 in FIG. 2) may be received by one or more antennas associated with a user device (e.g., by the communication module 228. Channel estimation results for one or more components associated with the signal received by the one or more antennas may be identified (e.g., by the data channel module 230), at block 604. The channel estimation results may include an amplitude and a phase associated with each signal component, according to one embodiment.

At block 606, the received signal may be converted to the frequency domain and/or the time domain for further analysis. Blocks 608, 610, 612, and 614 may relate to processing the received signal in the frequency domain, whereas blocks 630, 632, 634, and 636 may relate to processing the received signal in the time domain, according to one embodiment.

At block 610, one or more thresholds or filtering criteria for identifying one or more signal components affected by multipath fading or other types of interference may be determined (e.g., by the signal strength determination module 232). According to one example, thresholds may be set in the frequency domain to exclude the top and bottom ten percent (10%) (or another percentage) of signal components. According to another example, signal components that have a power (dB) that is associated with a valley or a cup-like portion of a signal in the frequency domain may be excluded. In the time domain, a power (dB) associated with a dominant signal (e.g., as determined by the signal strength determination module 232) may be used to determine an RSSI measurement. The peak value for the dominant signal may serve as the RSSI measurement, in one embodiment. Smaller peaks may represent signal components affected by multipath fading and therefore may be excluded from the RSSI measurement determination. Various other techniques for excluding signal components affected by multipath fading from a determination of an RSSI measurement may exist in other embodiments.

One or more signal components may be identified based at least in part on the one or more thresholds or criteria described above, at block 612. The identified one or more signal components may be excluded from a determination of an RSSI measurement. Thus, an RSSI measurement may be determined based at least in part on the remaining or non-excluded signal components (e.g., by the signal strength determination module 232), at block 614. Such a determination may include calculating the average, weighted average, etc., of signal components or signal components that were not identified as being affected by multipath fading or other types of interference. Numerous other calculations or determinations may exist in other examples.

Analysis of time domain signals may begin at block 632, where one or more thresholds for identifying a dominant portion of a time domain signal may be determined. As described above in FIG. 5, such a threshold may facilitate distinguishing a signal component that may have a significantly higher power value (dBm) than other signal components. A signal portion or component having a percentage change in power value (dBm) of 300% or more as compared to the next closest power value (dBm) associated with another signal component, may indicate the dominant portion of the signal, according to one example. Numerous other change percentages or threshold values may be used in other examples. The dominant portion of a signal in the time domain may be identified based at least in part on the one or more thresholds, at block 634.

An RSSI measurement associated with the time domain representation of the received signal may be determined, at block 636. In one embodiment, such a measurement may be the power value (dBm) associated with the dominant portion of the signal, for example, as identified at block 634.

In certain embodiments, a combined RSSI measurement may be determined based on the RSSI measurement determined in the frequency domain and the RSSI measurement determined in the time domain, at block 638. In one embodiment, the combined RSSI measurement may be determined by calculating an average, weighted average, etc., of the RSSI measurements in the frequency domain and the time domain. Using a weighted average approach, a greater weight may be assigned to an RSSI measurement for which a greater confidence exists that portions of a signal (e.g., subcarriers in the frequency domain and components in the time domain) associated with multipath fading have been excluded. For example, in the frequency domain, a relatively high confidence may be associated with an RSSI measurement determination in which a significant portion of signal components excluded from the RSSI measurement were identified in a valley or the cup-like portion of a signal. Such confidence may be considered to be greater than a confidence that a signal component is dominant in the time domain, for example. Therefore, a greater weighting factor (e.g., 0.6, 0.75, or other factors greater than 0.5) may be assigned to the RSSI measurement associated with the frequency domain signal. According to this example, an RSSI measurement determination may be weighted more heavily towards the frequency domain. Numerous other examples, including criteria for determining how to weight RSSI measurements in the frequency and time domains, may exist in other embodiments.

A determination may be made at block 640 as to whether more antennas associated with the user device exist. For example, a wireless card may include one or more antennas, each of which may be capable of receiving a signal from an access point, e.g., the access point 250 in FIG. 2. Each antenna, however, may receive a different signal strength or RSSI measurement associated with the received signal. Portions of the received signal that may be affected by multipath fading or other types of interference may be identified and excluded from a determination of a modified RSSI measurement, as described above. The modified RSSI measurement may be used by various location techniques, such as trilateration and fingerprinting, to determine a more accurate location of a user device (e.g., the user device 210 in FIG. 2).

Figure 6B:
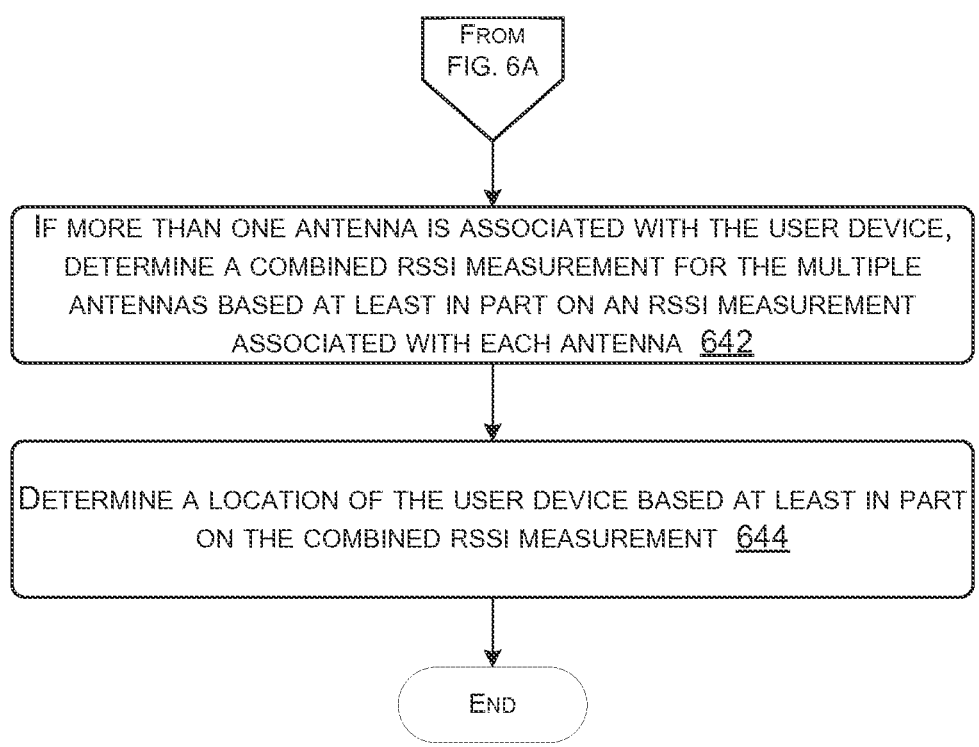
FIG. 6B illustrates a continuation of the flow diagram of the example process in FIG. 6A, according to an embodiment of the disclosure.

FIG. 6B is a continuation of the example process described in FIG. 6A. At block 642, an average, weighted average, etc., of RSSI measurements for each antenna may be performed to determine a combined RSSI measurement for multiple antennas. Such calculations may be the same or at least similar to the calculations performed at block 616. If only one antenna associated with a user device exists, then the determination of an RSSI measurement associated with the sole antenna may serve as the RSSI measurement for the user device.

At block 644, a location of the user device based at least in part on the determined RSSI measurement may be determined. Trilateration and fingerprinting are example techniques that may be utilized to determine the location of the user device. Various applications, such as an indoor navigation application, a shopping application, or other applications that may require more accurate or precise locations of the user device 210 may use the RSSI measurement to determine a more accurate location of the user device 210.

Although FIG. 6A and FIG. 6B describe determining a location based on combining RSSI measurements, for example, based on frequency domain and time domain determinations, as well as determinations for multiple antennas, some determinations may involve one or more such RSSI measurements. For example, an RSSI measurement based on analysis in the frequency domain may be the sole measurement used to determine the location of a user device. In other examples, the RSSI measurement based on analysis in the time domain may be the sole measurement used to determine the location of the user device. As explained, such measurements may be combined in other embodiments. In yet other embodiments, RSSI measurements associated with one or a combination of antennas that receive a signal from an access point may be used to determine the location of a user device. Different possibilities or combinations of RSSI measurements may be used to determine an RSSI measurement that may be used to determine a location of a user device, in other examples.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks.

As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, comprising:
   at least one memory that stores computer-executable instructions; and
   at least one processor configured to access the at least one memory, wherein the at least one processor is configured to execute the computer-executable instructions to:

receive, over the network from one or more access points, a signal comprising multiple signal components;
convert the signal to a frequency domain signal such that the multiple signal components are associated with a first respective power value and a frequency;
convert the signal to a time domain signal such that the multiple signal components are associated with a second respective power value and a time unit;
determine a first signal strength measurement associated with the frequency domain signal based at least in part on the first respective power value;
determine a second signal strength measurement associated with the time domain signal based at least in part on the second respective power value; and
determine a combined signal strength measurement based at least in part on the first signal strength measurement and the second signal strength measurement.

2. The device of claim 1, the at least one processor further configured to determine a location of the user device based at least in part on the combined signal strength measurement.

3. The device of claim 1, wherein the determination of the first signal strength measurement comprises the at least one processor being further configured to:
identify at least a portion of the multiple signal components in the frequency domain signal having a respective power value that is located in a valley portion of the signal or a different respective power value that differs from a power value associated with a preceding portion by more than a threshold value;
wherein the determination of the first signal strength measurement does not include the at least a portion of the multiple signal components.

4. The device of claim 1, wherein the determination of the second signal strength measurement comprises the at least one processor being further configured to:
identify a dominant component in the time domain signal based at least in part on the second respective power value associated with the multiple signal components.

5. The device of claim 1, wherein the signal is modulated via Orthogonal Frequency Division Multiplexing (OFDM).

\* \* \* \* \*